(12) United States Patent
Kogure et al.

(10) Patent No.: US 7,534,959 B2
(45) Date of Patent: May 19, 2009

(54) POWER SUPPLY DEVICE

(75) Inventors: Naoto Kogure, Shizuoka (JP); Hisashi Takemoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/007,761

(22) Filed: Jan. 15, 2008

(65) Prior Publication Data
US 2008/0173478 A1 Jul. 24, 2008

(30) Foreign Application Priority Data
Jan. 22, 2007 (JP) ............................. 2007-011319

(51) Int. Cl.
*H01B 7/06* (2006.01)
(52) U.S. Cl. ................ 174/72 A; 174/68.1; 174/135; 174/72 C; 439/501
(58) Field of Classification Search .............. 174/72 A, 174/68.1, 68.3, 69, 97–99 R, 135, 72 C, 70 R, 174/70 C; 439/501, 502, 162; 361/826; 248/629; 296/149, 152; 138/111, 157, 158
See application file for complete search history.

(56) References Cited

U.S. PATENT DOCUMENTS

| 7,253,361 | B2 * | 8/2007 | Nishijima et al. ......... 174/72 A |
| 7,306,481 | B2 * | 12/2007 | Tsukamoto .................. 439/501 |
| 7,341,478 | B2 * | 3/2008 | Tsubaki et al. .............. 439/501 |
| 7,375,281 | B2 * | 5/2008 | Kogure et al. ............. 174/72 A |
| 7,381,897 | B2 * | 6/2008 | Nishijima et al. ......... 174/72 A |
| 2002/0005014 | A1 | 1/2002 | Doshita et al. | |

FOREIGN PATENT DOCUMENTS

| JP | 2001-354085 | 12/2001 |
| JP | 2004-187375 | 7/2004 |

* cited by examiner

*Primary Examiner*—Dhiru R Patel
(74) *Attorney, Agent, or Firm*—Edwards Angell Palmer & Dodge LLP

(57) ABSTRACT

The object of the invention is to provide an improved power supply device capable of minimizing its size, keeping a slider from rattling within a protector, and regulating the direction of a wiring harness extending through the protector.

The afore-mentioned object can be achieved by a power supply device in accordance with the present invention includes a guide rail having two concave arch sections, and an convex arch section in continuation with each of the concave arch sections in its both ends, a movable slider guided along the guide rail, and a floating wiring harness fixed to the slider. In the power supply device, the guide rail can be disposed within a protector having an opening through which the wiring harness extends. Further, the slider has two opposing curved surfaces for passing the guide rail therebetween.

2 Claims, 6 Drawing Sheets

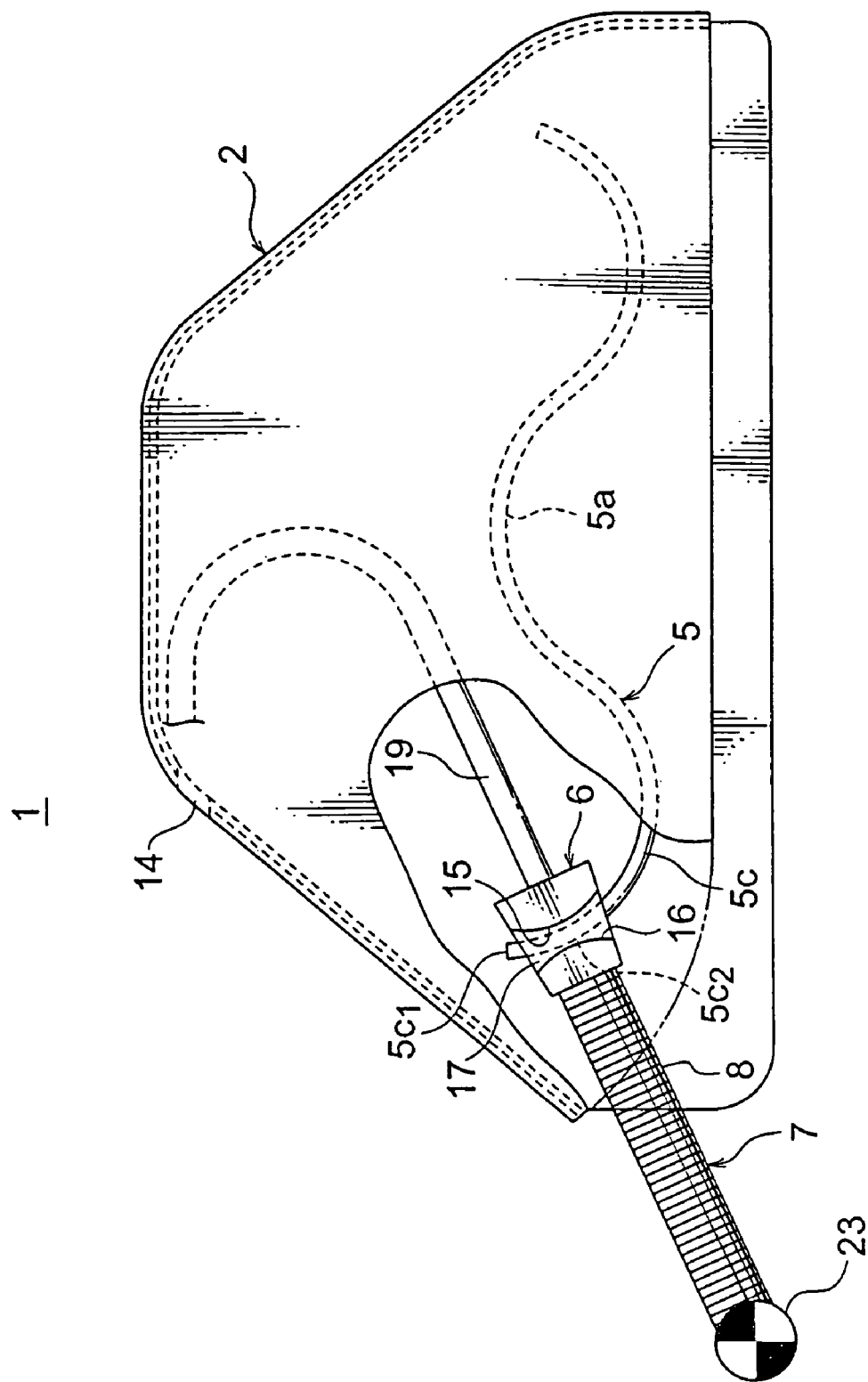

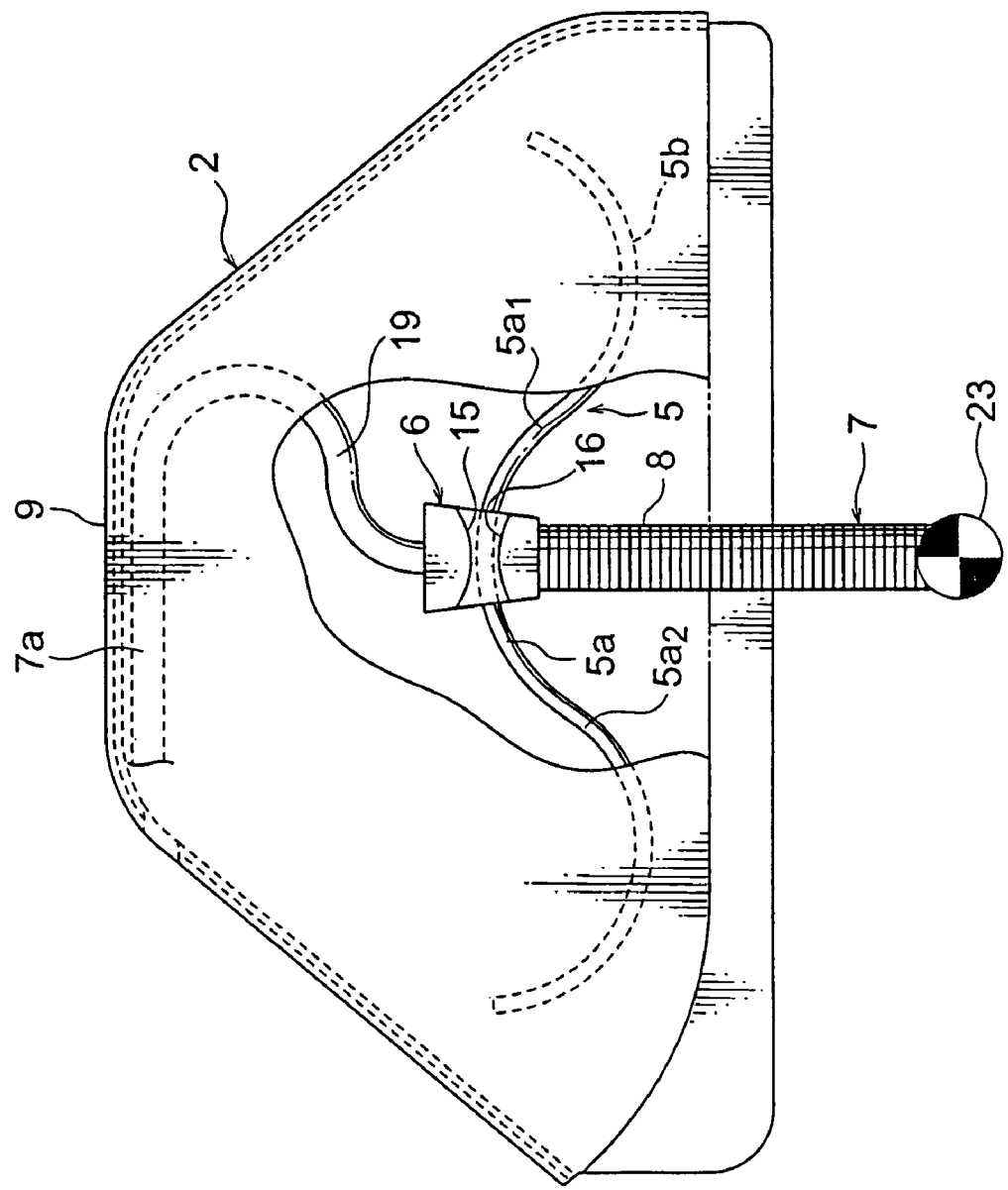

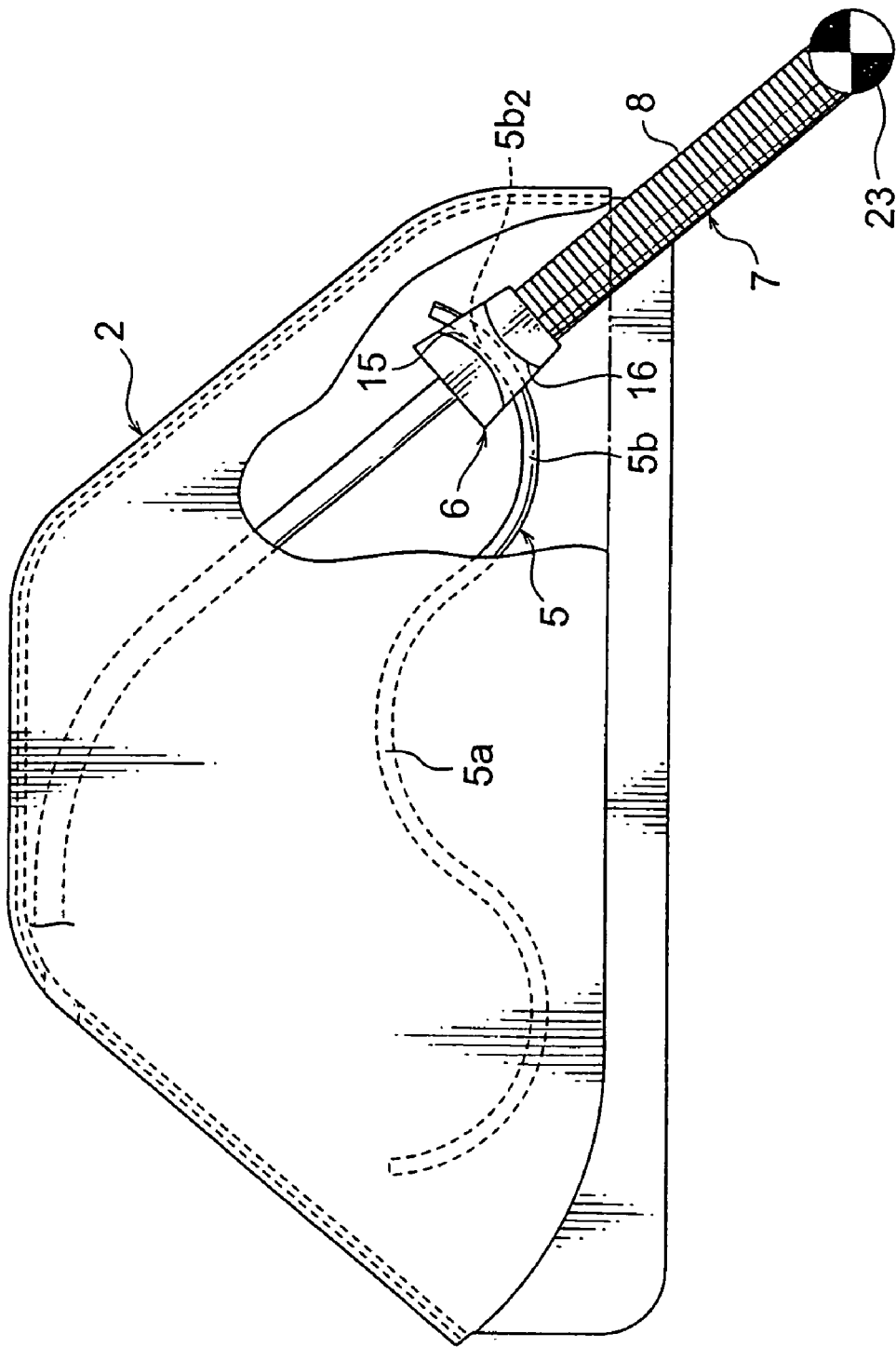

POWER SUPPLY DEVICE

CROSS-REFERENCE TO RELATED APPLICATIONS

The present Application claims priority to Japanese Patent Application No. 2007-11319 filed Jan. 22, 2007, the entire disclosure of which, including the specification and drawings, is expressly incorporated herein by reference.

BACKGROUND OF THE INVENTION (1) Field of the Invention

The present invention relates to a power supply device where a wiring harness is slidably arranged along a guide rail. The power supply device can be employed for example in a sliding door of a vehicle.

(2) Description of the Related Art

An exemplary conventional power supply device is shown in FIGS. 6 and 7. For example, the conventional power supply device is disclosed in Japanese Publication of Patent Application No. 2001-354085. In detail, refer to FIGS. 4, 7, and 13 of the Japanese publication.

In FIGS. 6 and 7, the power supply device 50 is positioned on the sliding door 41 of a vehicle, and is shown to include a protector 42 formed of synthetic resin material and configured to receive a wiring harness 43, and a flat spring 44 capable of upwardly energizing the wiring harness 43 within the protector 42.

The protector 42 is comprised of a protective base (also designated as a reference numeral 42) and a protective cover (now shown). The protective cover and the protective base respectively have an opposing substrate 51 and a peripheral wall 52. The protective cover is engaged with the protective base, which is secured to the panel of the sliding door 41 by means of a bolt 56, a crimping means and so on. A circular harness winding section 54 for controlling the radius of curvature of the wiring harness 43 and the flat spring 44 are unitarily formed on the inner surface of the substrate 51.

The lower end of the flat spring 44 is secured to the wiring harness 43 as well as a harness fixing section 55 disposed in the protector 42. A cap member formed of synthetic resin and positioned in the front end of the flat spring 44 supports the wiring harness 43 in a stable manner.

During the wiring harness 43, there are provided a plurality of insulated electrical wires 43a, which are covered with a corrugate tube 43b formed of synthetic resin. In this construction, the front end of the corrugate tube 43b is secured to the harness fixing section 55 of the protector 42 by means of a fixing member such as tapes. The corrugate tube 43b has a good flexibility, which is because it has alternate circumferential convex and concave portions in its longitudinal direction.

The electrical wires 43a of the wiring harness 43 extend through the front portion of the protector 42, and then are connected to the accessory of the sliding door side. The corrugate tube 43b of the wiring harness 43 extends through an lower elongated opening 45 of the protector 42, then a space 46 (refer to FIG. 7), and then a fixture 53 of the wiring harness 43 side (also designated as a harness fixing section), which is positioned in a vehicle body 47, while holding its all freedom of movement. Finally, the corrugated tube 43b is connected to the wiring harness (now shown) of the vehicle body side by means of a connector. The protector 42 is covered with a door trim piece (now shown) formed with synthetic resin, and therefore is invisible. The wiring harness 43 extends through the opening of the door trim piece, and then the vehicle body side.

FIGS. 6 and 7 respectively illustrate the sliding door 41 in its fully closed position and fully open position. In its fully closed position, the wiring harness 43 is pulled in a rearward direction while being supported by the harness fixture 53 of the wiring harness 43. On the other hand, in its fully open position, the wiring harness 43 is pulled in a forward direction, and therefore is bent along the circumferential plane of the harness winding section 54, allowing for controlling the minimum radius of curvature of both the flat spring 44 and the wiring harness 43. As a result, both the flat spring 44 and the wiring harness 43 are prevented from undergoing excessive plastic deformation.

Under the condition where the sliding door 41 is partially open, while the wiring harness 43 is inclined to unroll in a downward direction, it is energized in an upward direction by use of the flat spring 44 and therefore the extra length of the wiring harness (i.e. the remaining length of the wiring harness) can be received. As a result, the extra length of the wiring harness 43 can prevented from being jammed. Immediately after opening, the sliding door 41 moves along a guide rail (now shown) while departing from the vehicle body 47 side.

Further, the power supply device 50 can be formed in a horizontal direction with respect to not the sliding door 41 but the vehicle body 47. Refer to the Japanese Publication of Patent Application No. 2001-354085.

In addition to the afore-mentioned power supply device, a power supply device including a semicircular arch-shaped guide rail, and a spherical slider fixed to a wiring harness and slidably guided along the guide rail is widely known. Refer to FIGS. 1 to 3 in Japanese Publication of Patent Application No. 2004-187375. The slider is positioned at the highest point of the guide rail, thereby allowing the extra length of the wiring harness to be leaded into the protector.

Meanwhile, in the case of using afore-mentioned power supply device 50 depicted in FIG. 6, since the power supply device has a configuration that the wiring harness 43 is upwardly energized by the flat spring 44 within the protector 42, the protector usually needs more space for receiving the extra length of the wiring harness. Further, due to the inner space of the harness winding section, the protector 42 size is largely increased.

Moreover, during the afore-mentioned power supply device disclosed in the Published Japanese Patent Application 2004-187375, since the spherical slider is positioned on the guide rail, the slider is free to move without any restriction. In cases where the wiring harness extends through the protector with the door fully open or closed, it is difficult to regulate the direction of the wiring harness to be drawn.

To solve the afore-mentioned drawbacks, the purpose of the present invention is to provide a power supply device which a) is intended for minimizing its size by efficiently utilizing the inner space of a protector and efficiently receiving a wiring harness within the protector, b) keeps the slider from rattling within the protector, and c) makes it possible to regulate the direction of the wiring harness to be drawn.

SUMMARY OF THE INVENTION

According to one aspect of the present invention, there is provided a power supply device comprising a guide rail having two concave arch sections, and an convex arch section in continuation with each of the concave arch sections in its both ends, a movable slider guided along the guide rail, and a floating wiring harness fixed to the slider.

In this power supply device, the guide rail can be disposed within a protector having an opening through which the wiring harness extends.

Further, the slider can have two opposing curved surfaces for passing the guide rail therebetween.

BRIEF DESCRIPTION OF THE DRAWINGS

FIG. 3 is a front view of the power supply device of FIG. 1, with a sliding door fully closed.

FIG. 4 is a front view of the power supply device of FIG. 1, with the sliding door partially open.

FIG. 5 is a front view of the power supply device of FIG. 1, with the sliding door fully open.

Figure 1:
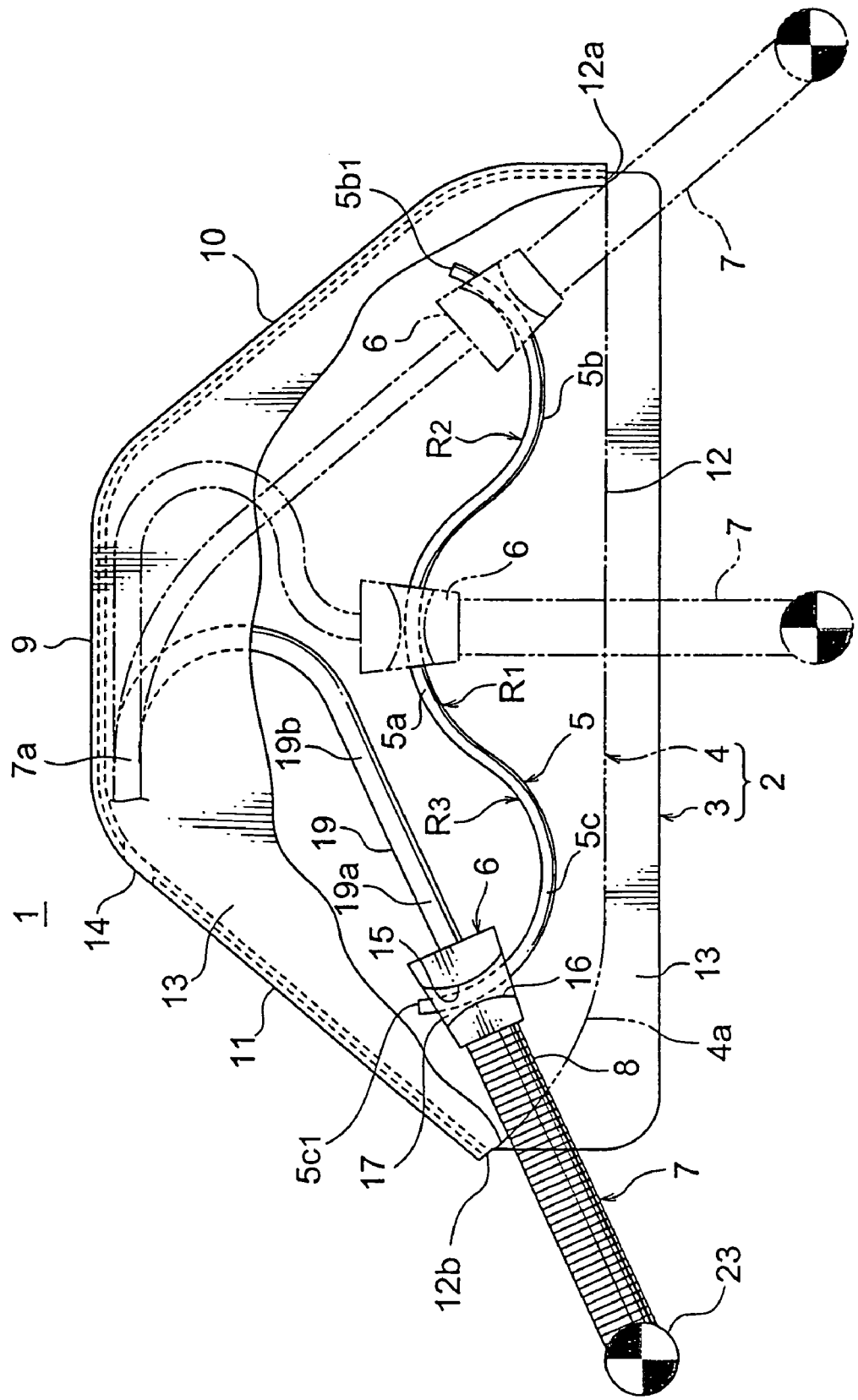
FIG. 1 is a front view of a power supply device in accordance with one embodiment of the present invention with partially deleted.

The foregoing summary, as well as the following detailed description of certain embodiments of the present invention, will be better understood when read in conjunction with the appended FIGS. 1 to 7. For the purpose of illustrating the invention, there is shown in the drawings, certain embodiments. It should be understood, however, that the present invention is by no means limited by the appended drawings.

DESCRIPTION OF THE PREFERRED EMBODIMENTS

FIGS. 1 to 5 pertain to a power supply device in accordance with one embodiment of the present invention.

As shown in FIG. 1, the power supply device 1 is mounted to (i.e. parallel to) a vehicle sliding door (not shown) in a vertical direction, and is shown to include a protector 2 (i.e. a case) formed of synthetic resin, a wave-shaped guide rail 5 positioned inside the protector 2, a movable slider guided through the guide rail 5, and a corrugate tube 8 of a wiring harness fixed to the guide rail 5.

The protector 2 is comprised of a protective case 3 having a relatively lower height and a protective cover 4. These protective case 3 and protective cover 4 are fixed to each other by an engaging member (now shown). The peripheral walls of the protector 2 include a horizontal top wall portion 9, a front wall portion 10, and a rear wall portion 11. These front wall portion 10 and rear wall portion 11 are connected to and inclined from the top wall portion 9, and are also connected to an opening 12 for passing the wiring harness though. In this configuration, the elongated opening 12 is disposed in the lower portion of the protector 2.

An inner space for receiving the wiring harness is surrounded by the respective peripheral wall portions 9, 10, 11 and a substrate portion 13. The substrate portion 13 of the protective base 3 side is longer than the substrate portion 13 of the protective cover 4 side. Preferably, the edge of the opening (designated as a reference numeral 12) of the protective cover 4 enlarges outwardly while functioning as a harness guiding surface. The lower end 12b of the rear wall portion 11, i.e. the rear end of the elongated opening 12, is arranged in a higher position than the lower end 12a of the front wall portion 10, i.e. the front end of the opening 12. The edge 4a of the rear portion of the opening 12 in the protective base 4 has a curved shape.

There is provided a relatively narrow opening 14 for passing the wiring harness through on top of the rear wall 11. The upper section 7a of the wiring harness 7 extends along the top wall 9 and also extends outwardly from the opening 14 in a horizontal direction. The upper section 7a of the wiring harness 7 is secured to the protector 2 in the vicinity of the opening 14 by means of a fixing member such as a belt and a tape. However, the opening 14 can be positioned on the top wall portion 9 or the substrate portion 13, i.e. a bottom wall of the protector base 3, without being limited to the rear wall portion 11.

In the lower section of the protector 2, a pair of wave-shaped guide rails 5 opposing each other is provided. Preferably, the guide rail is unitarily resin-molded with the protector 2. In FIG. 1, the guide rail 5 of the protective base 3 side is shown. For example, the wave-shaped guide rail 5 is disposed lengthwise about the protector 2 in the position higher than the lower opening 12 (i.e. vertically spacing from the opening 12).

The guide rail 5 comprises an convex arch section 5a in the center of the protector 2, an concave arch section 5b residing in front of the convex arch section 5a, and another concave arch section 5c residing behind the convex arch section 5a. In this configuration, these arch sections 5b, 5a, and 5c are successively connected to each other. The end portions 5b1 and 5c1 of the front and rear concave arch sections 5b and 5c are substantially positioned as high as the top of the convex arch section 5a.

In this embodiment, the respective radius of curvature R2 and R3 of the concave arch sections 5b and 5c are the same or similar to each other. The end portion 5c1 of the rear concave arch section 5c is positioned slightly higher than the end portion 5b1 of the front concave arch section 5b. In the convex arch section 5a, the front half arch section and the rear half arch section are in a symmetrical configuration. The shape of each arch section (i.e. the radius of curvature and the height of the concave arch sections, 5b and 5c) depends on a vehicle which the power supply device will be amounted to, the stroke needed for opening or closing a sliding door, and the length of a wiring harness extending outwardly from (i.e. extending through) the protector and so on.

The slider 6 can be formed with synthetic resin and molded into a block-like shape. The slider 6 has curved surfaces 15 and 16 opposing to each other and receiving the guide rail 5 therebetween in order to slide over the guide rail 5 much smoothly. The curved surfaces 15 and 16 are most closely spaced from each other in their most raised center portion. These two curved surfaces 15 and 16 should be spaced just slightly farther apart than the thickness of the guide rail 5.

The radius of curvature of the upper curved surface 15 is the same as or slightly smaller than the radius of curvature (R2 and R3) of the concave arch sections 5b and 5c. The radius of curvature of the lower curved surface 16 is the same as or slightly smaller than the radius of curvature (R1) of the convex arch section 5a.

Accordingly, the slider 6 can slide over the guide rail 5 smoothly. As a result, when the sliding door is open, partially open, or closed, it can be appropriately regulated which the wiring harness extending outwardly from the protector 2 has to be directed to. That is to say, the direction of the wiring harness extending through the protector 2 can be regulated.

Figure 2A:
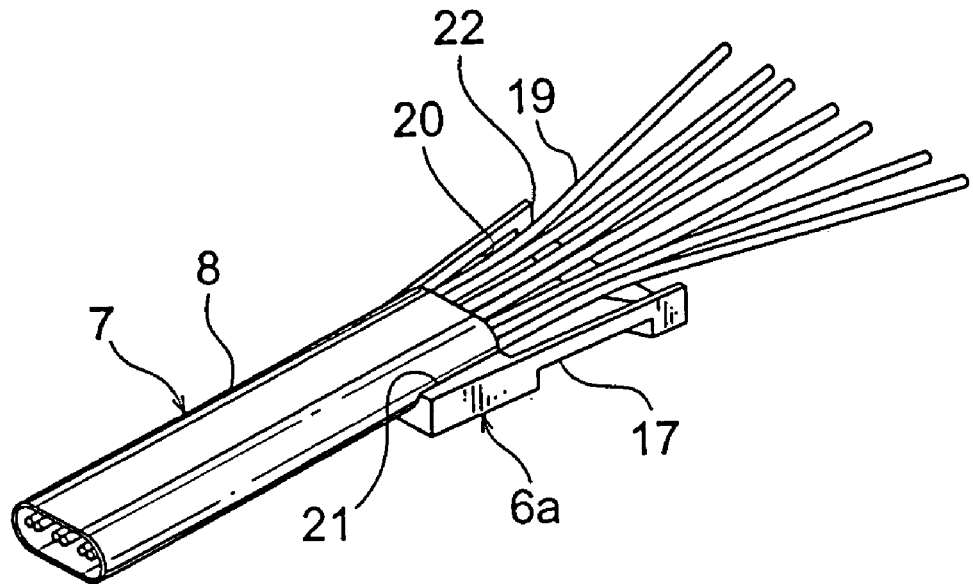
FIG. 2A is a perspective view of a slider of the power supply device being in course of assembling it.
Figure 2B:
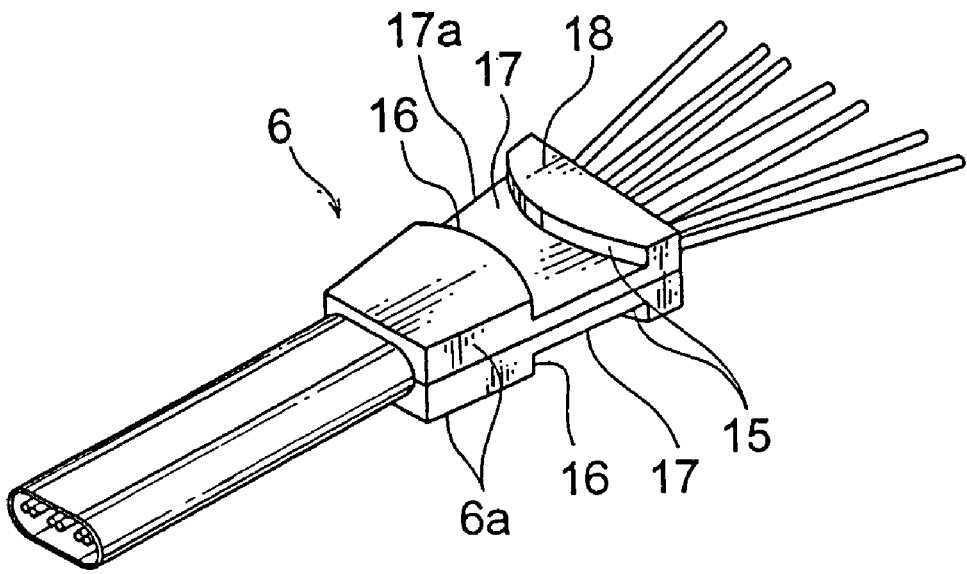
FIG. 2B is a perspective view of the slider of FIG. 2A which has been completely assembled.
Figure 6:
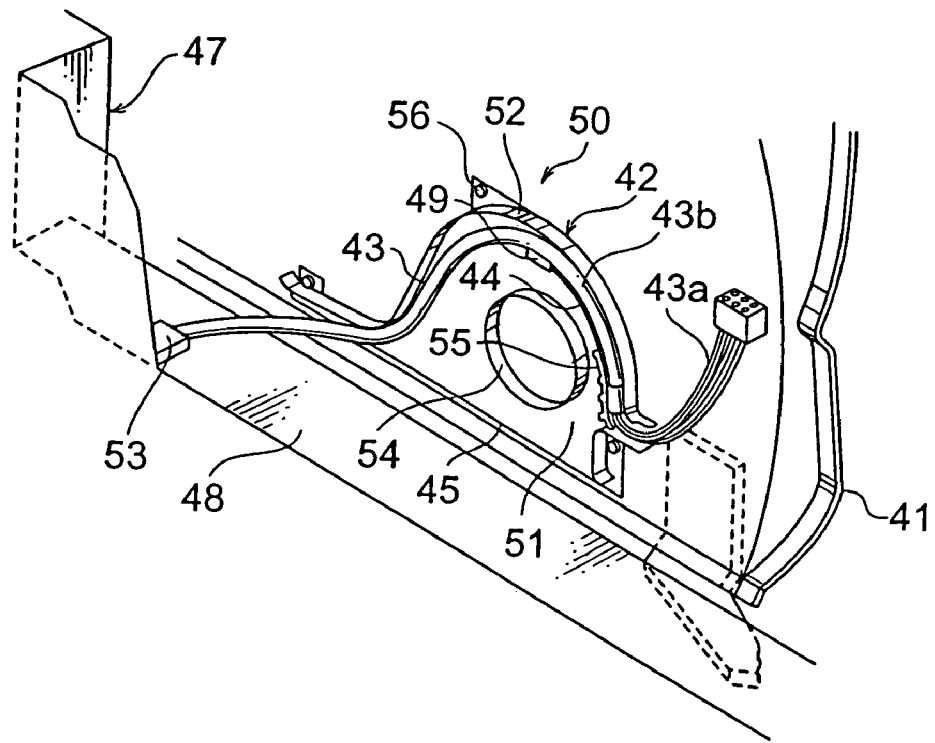
FIG. 6 is a front view of an exemplary conventional power supply device, with a sliding door fully closed.
Figure 7:
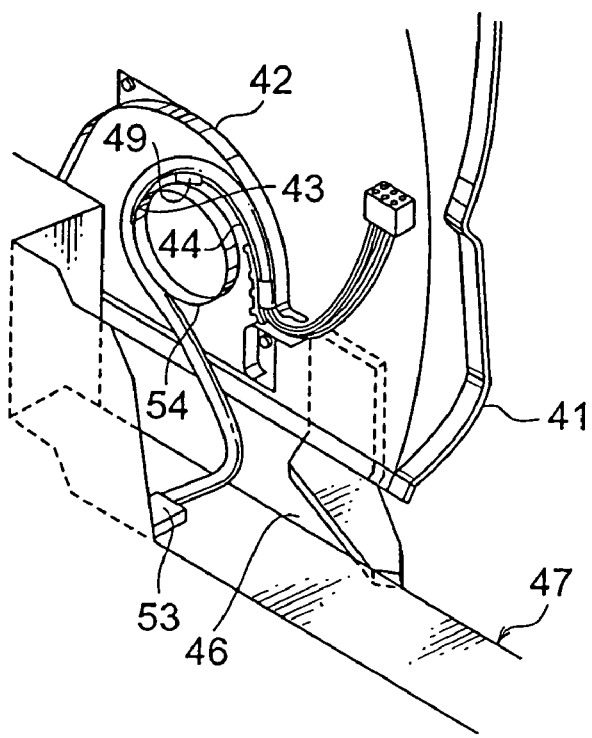
FIG. 7 is a front view of the power supply device of FIG. 6 immediately before the sliding door is fully open.

As shown in FIGS. 2A and 2B, the slider 6 can be divided into two sections, left one and right one. Each divided slider sections 6a can be secured to each other by an engaging member (not shown). Each divided slider sections 6a can be formed in symmetrical configuration. In this configuration, a groove portion 17 is provided in each of left and right exterior walls 18, and therefore the curved surfaces 15 and 16 constitute the groove portion 17. The groove portion 17 can have an opening 17, which has maximum width in its both end portions, but has minimum width in its center portion.

As shown in FIG. 2A, the divided slider 6a is shown to include a space 20 for passing the electrical wires 19 of the wiring harness therethrough, and an aperture 21 for passing the end portion of the corrugate tube 8 of the wiring harness 7 therethrough while fixing it. The space 20 has very small thickness, and therefore a plurality of insulated electrical wires 19 should be aligned in parallel with one another within the space 20. The space 20 and the groove 21 communicate with each other in a direction where the wiring harness 7 passes through, and are open to outside. An opening which the wiring harness 7 passes through can be designated as a reference numeral 22.

In this embodiment, the corrugate tube 8 is formed with synthetic resin, having cross section of an ellipse. The corrugate tube 8, which has alternate circumferential raised and recessed portions in its longitudinal direction for excellent flexibility, is well known to one skilled in the art. The corrugate tube 8 can be engaged with the rib formed on the inner circumferential surface of the groove 21 of the divided sliders 6a, while being crimped by both divided sliders 6a across its minor axis. In this way, the corrugate tube 8 can be securely fixed.

In a case where the corrugate tube 8 is substituted by a protective tube such as a mesh tube, the afore-mentioned rib can be also substituted by a pin-like projection on the inner circumferential surface of the groove 21 of the divided sliders 6a. In this case, the projection passes through the corrugate tube 8, and thus the corrugate tube 8 is securely fixed. Alternatively, an adhesive can be employed for the same purpose. Further, a plurality of electrical wires 19 as the wiring harness 7 can also be fixed by crimping the electrical wires 19 by means of the divided sliders 6a, without employing the protective tube such as the corrugate tube 8. In this case, it is desired to bind a plurality of the electrical wires 19 at least partially by means of a belt, a tape, and so on for preventing them from being scattered.

The electrical wires 19, which have been introduced inside the protector 2 through the slider 6, are arranged in a flat configuration at least in the vicinity of the protector 2. This area is designated by a reference numeral 19a. The electrical wires 19 thus obtained are bound to form the afore-mentioned construction having the cross section of ellipse 19b, and then are connected to the upper wiring harness section 7a. The wiring harness section having the cross section of ellipse 19b can be at least partially bound by a belt, a tape and so on for preventing them from being scattered. It is also possible to cover the electrical wires 19 with a protective tube such as a flexible mesh tube in the protector 2. Since a plurality of the electrical wires 19 can be arranged in a flat configuration inside the slider 6, not only the slider 6 but also the protector 2 can be slimmed.

In FIG. 1, the protector 2 is mounted to the sliding door. In this case, the upper electrical wires section 7a of the wiring harness 7 extending outwardly from the upper opening 14 is connected to an accessory of the sliding door side via a connecting member such as a connector. The lower electrical wires section, i.e. the corrugate tube 8 section, will be arranged in the harness fixing part 23 of an vehicle body side via the lower opening 12 of the protector 2. The end of the corrugate tube 8 is supported by the wiring harness fixing part 23 in a manner that it can hold its all freedom of movement in its circumferential direction. The electrical wires 19 extending outwardly from the corrugate tube 8 toward the vehicle body are connected to the wiring harness of the vehicle body side (now shown) by means of a connecting member such as a connector.

FIG. 3 illustrates the power supply device with the sliding door fully closed by moving the sliding door together with the protector 2 toward the front side of the vehicle.

The wiring harness 7 is supported by the harness fixing part 23 and is pulled rearwardly with respect to the harness fixing part 23 of the vehicle body side. In this case, the slider 6 traverses rearwardly across the guide rail 5 to arrive at the end 5c1 of the concave arch section 5c, and the corrugate tube 8 extends outwardly from the protector 2 and is drawn slightly downwardly toward the harness fixing part 23. The electrical wires section 19 of the wiring harness 7 extending outwardly from the slider 6 is bent into an approximate "J" shape and is connected to the opening 14 for passing the upper wiring harness therethrough.

The upper curved surface 15 within the groove 17 of the slider 6 substantially comes in contact with the curved inner surface of the curved section 5c2 disposed in the rear side of the concave arch section 5c at the same radius of curvature as R3. The top of the curved surface 16 disposed in the rear side substantially comes in contact with the curved exterior surface of the curved section 5c2 disposed in the rear side of the concave arch section 5c.

Since the curved surface 15 disposed in upper side substantially comes in contact with the concave arch section 5c at the same radius of curvature as R3, the corrugate tube 8 extending outwardly from both the slider 6 and the wiring harness 7 can be precisely regulated. In other words, in the case of the sliding door being fully closed, the corrugate tube 8 is substantially straightly pulled without any relaxation (i.e. without hanging down), and therefore the corrugate tube 8 and the electrical wires 19 therein each have minimum length as calculated. As a result, excessive tension is prevented from being applied to the corrugate tube 8, and thus causing damage resulting from such an excessive tension to be avoided.

In a case where the groove 17 of the slider 6 is linearly formed and the guide rail 5 is not a wave-shaped but a simple convex arch form, when the sliding door is fully closed, the slider 6 is disposed in not an inclined position but a downward position in the section 5c. Accordingly, because the corrugate tube 8 is pulled from the slider 6 with highly rearwardly bent, the length of the corrugate tube 8 extending between the slider 6 and the harness fixing part 23 is longer than the calculated value of the length, thereby causing the corrugate tube 8 to be strongly pulled and finally to be damaged.

In a case where the sliding door moves rearward together with the protector 2 from a closed position as shown in FIG. 3 to an open position over a vehicle opening, the slider 6 is guided along the concave arch section 5c disposed at the rear side of the guide rail 5 while being supported by the harness fixing part 23 of the vehicle body side. In this case, the position of the harness fixing part 23 will not be altered. Moreover, in the case of the sliding door being partially open as shown in FIG. 4, the slider 6 ascends along the convex arch section 5a disposed in the center of the guide rail 5 (i.e., along the curved section 5a2) and then arrives at the top of the convex arch section 5a.

Due to this configuration, the corrugate tube 8 of the wiring harness 7, particularly the extra length of the wiring harness can be securely leaded into the protector 2 thus being prevented from unrolling, even if the sliding door is partially open. The electrical wires 19 of the wiring harness 7 extending outwardly from the slider 6 are compressed in the height direction, and are bent into an approximate "J" shape. The upper electrical wire section 7a extends horizontally along the top wall 9 of the protector 2.

In cases where the slider 6 ascends or descends the convex arch section 5a, since the lower curved surface 16 of the slider 6 substantially comes in contact with the arch-shaped lower surface of the convex arch section 5a, the slider 6, in particular, its direction, can be precisely regulated. Accordingly, the corrugate tube 8 connected to the slider 6 can be precisely regulated particularly in its direction. Due to this characteristic, the corrugate tube 8 can be kept from unnecessary movement such as rattling and delay in movement, and thus causing the extra length of the wiring harness to be securely leaded in the protector and the slider 6, the corrugate tube 8 and sliding door to be easily moved without requiring undue force.

In a case where the sliding door moves rearward together with the protector 2 from a partially open position as shown in FIG. 4 to a fully open position, the wiring harness 7 is pulled forwardly while being supported by the harness fixing part 23. In other words, the wiring harness 7 is pulled toward the harness fixing part 23. In this case, the slider 6 descends the front half curved section 5a1 of the convex arch section 5a in the guide rail 5, and then moves along the concave arch section 5b. In this way, the sliding door will be fully open.

As shown in FIG. 5, the slider 6 ascends the front half curved section 5b2 of the concave arch section 5b and then stops. The upper curved surface 15 of the slider 6 is disposed with being in contact with the arch-shaped upper surface of the concave arch section 5b. Likewise, the corrugate tube 8 extending outwardly from the slider 6 can be precisely regulated in particular in its direction. Accordingly, as described in relation to door closing in FIG. 3, the corrugate tube 8 of the wiring harness 7 can prevent undue tension from being applied thereto, thus enhancing durability of the corrugate tube 8.

In a case where the sliding door moves forwardly together with the protector 2 from a fully open position as shown in FIG. 5 to a fully closed position, the operations can be easily reversed, i.e. from FIG. 5 to FIG. 3.

In accordance with the afore-mentioned embodiment of the present invention, since the curved surfaces 15 and 16 of the slider 6 substantially comes in contact with the convex arch section 5a and the concave arch sections 5b and 5c of the guide rail 5, even if exterior force is applied thereto, the contact area of the sliding portion can be constantly maintained. As a result, only a small amount of force is required to move the slider 6 along the guide rail 5 smoothly, allowing the wiring harness 7 to be drawn and/or to be leaded.

Further, the direction to which the wiring harness 7 has to be directed is precisely regulated in the convex arch section 5a and the concave arch sections 5b and 5c of the guide rail 5, and in the curved surfaces 15 and 16 of the slider 6, thus causing the durability of the wiring harness 7 to be enhanced. In addition, since the extra length of the wiring harness is downwardly drawn in a vertical direction in the approximate center of the protector 2, without employing the conventional flat spring 44 (see FIG. 6) and harness winding section 54, the space within the protector 2 can be efficiently utilized as a space for receiving the wiring harness, causing the protector 2 to be minimized in size.

In accordance with the afore-mentioned embodiment of the present invention, the slider 6 is trapezoid in shape. However, the shape of the slider 6 is not limited to trapezoid, but may be any other shape including rectangle, square, circle, and so on. Irrelevant to the shape of the slider 6, the groove 17 is provided in the approximate center of the slider 6.

In accordance with the afore-mentioned embodiment of the present invention, the height of the center of the convex arch section 5a of the guide rail 5 is the same as that of the concave arch sections 5b and 5c. However, in cases where the extra length of the wiring harness 7 to be leaded in the protector 2 is long, the height of the convex arch section 5a may be set to be much higher than that of the curved sections 5a2 and 5b2. In other word, the height of the convex arch section 5a can be properly controlled depending on the extra length of the wiring harness 7 to be leaded in.

In accordance with the afore-mentioned embodiment of the present invention, the wave-shaped guide rail 5 is provided with the convex arch section 5a, and the concave arch sections 5b and 5c. However, it should be understood that the convex arch section 5a, the concave arch sections 5b and 5c can be respectively formed with trapezoidal (i.e. convex) section and inverted trapezoidal (i.e. concave) section. In this case, only the joint portion may be formed with a circular arc shape. Further, the convex arch section 5a and the concave arch sections 5b and 5c can be formed as a waveform consisting of a circular arc-shaped section and a linear section (not shown).

Moreover, in accordance with the afore-mentioned embodiment of the present invention, while the corrugate tube 8 having a cross section of an ellipse is employed. However, if there is allowance in thickness of the protector 2, the corrugate tube 8 having a cross section of circle can be employed (not shown). In this case, the electrical wires 19 not only can be arranged in a flat configuration within the protector 2, but also can be bound to one another while having a circular cross section.

In accordance with the afore-mentioned embodiment of the present invention, the grooves 17 are formed on both sides of the slider 6, and the guide rail 5 is provided both the protective base 3 and the protective cover 4. However, for example, replacing the groove 17, the aperture having the upper and lower curved surfaces 15 and 16 (not shown) is provided within the protector 2, and, a guide rail 5 is floated in the inner space of the protector 2, for example, the both ends of the guide rail 5 are connected to the inner surfaces of the front wall 10 and the rear wall 11 of the protective base 3. In this case, the slider 6 is divided into two parts, which are assembled with the guide rail 5. In this construction, the divided sliders 6a can be engaged with each other. In this case, the electrical wires 19 will pass through the bilateral space of the guide rail within the slider 6.

In accordance with the afore-mentioned embodiment of the present invention, the protector 2 is arranged on the sliding door disposed in the left side of a vehicle. In other words, the protective cover 4 is disposed adjacent to the vehicle body. However, the protector 2 of FIG. 1 can be overall reversed. In other words, in cases where the protective base 3 is arranged adjacent to the vehicle body, the sliding door moves from a fully closed position to a fully open position.

In accordance with the afore-mentioned embodiment of the present invention, the protector 2 is orientated vertically with respect to the sliding door. However, the protector 2 may be orientated vertically with respect to the vehicle body (i.e. fixed structure) as well as may be orientated horizontally with respect to the vehicle body or the sliding door. In cases where the protector 2 is horizontally arranged, when the sliding door being partially open, the wiring harness 7 will be leaded into the protector 2 not upwardly but toward the right hand or left hand of the vehicle. The protector 2 can also be orientated vertically, horizontally, or inclinatorily with respect to the sliding door or the vehicle body.

In accordance with the afore-mentioned embodiment the present invention, the power supply device is applied to a vehicle sliding door. However, the power supply device of the present invention can also be applied to, for example, a sliding door other than a vehicle sliding door, a sliding door for a device of preparing a product, a sliding door for a survey instrument, and so on. Further, this construction of the present invention can be employed as not only a power supply device, but also as a power supply construct or a construct for arranging a wiring harness.

In accordance with the afore-mentioned embodiment of the present invention, the protector 2 is used for receiving the wiring harness 7. However, while omitting the protector 2, the raised portion of inner panel of the sliding door can be joined with the recessed portion of the door trim piece, and the slider 6 can be engaged with the guide rail 5 formed on the door trim piece and/or the inner panel of the sliding door. In this case, replacing the opening 14 of the protector 2, a fixing member such as a clamp can be employed for fixing the upper wiring harness section 7a of the wiring harness 7 to the inner panel of the sliding door and/or door trim piece.

Hereinafter, there will be illustrated several advantageous effects in accordance with the present invention.

As mentioned previously, according to one aspect of the present invention, there is provided a power supply device comprising a guide rail having two concave arch sections, and an convex arch section in continuation with each of the concave arch sections in its both ends, a movable slider guided along the guide rail, and a floating wiring harness fixed to the slider. First of all, since this power supply device do not employ a conventional flat spring portion and a harness winding section, the space within the protector can be efficiently utilized as a space for receiving the wiring harness, thereby causing the protector size to be decreased. Secondly, in this power supply device, since the slider is engaged with the guide rail, the slider is kept from rattling within the protector. Thirdly, in this power supply device, since the slider is arranged in an inclinatory direction along both concave arch sections and the wiring harness is drawn in the same direction as the slider, undue tension is never applied to the wiring harness, and therefore, durability of the wiring harness will be enhanced.

Further, according to another aspect of the present invention, the guide rail can be disposed within a protector having an opening through which the wiring harness extends. In this power supply device, since the guide rail and the slider are unitarily formed with the protector in order to constitute a single unit, the power supply device is easy to handle and can be easily amounted to a sliding structure.

Further, according to yet another aspect of the present invention, the slider has two opposing curved surfaces for passing the guide rail therebetween. Since the curved surface of the slider can substantially come in contact with the arch sections of the guide rail in a slidable manner and the slider moves along the guide rail smoothly by applying only small amount of force, the wiring harness is allowed to be securely drawn and/or leaded. Also, since the curved surface of the slider substantially comes in contact with the arch sections of the guide rail allowing the directions of the slider and the wiring harness to be determined, undue tension is kept from being applied to the wiring harness and therefore durability of the wiring harness will be enhanced. As a result, the reliability of the power supply device can be enhanced.

Changes and modifications in the specifically described embodiments would come within the scope of the invention, which is intended to be limited only by the scope of the appended claims, as interpreted according to the principles of patent law.

What is claimed is:

1. A power supply device, comprising:
   a guide rail having two concave arch sections, and an convex arch section in continuation with each of the concave arch sections in its both ends;
   a movable slider guided along the guide rail; and a floating wiring harness fixed to the slider, wherein the guide rail is disposed within a protector having an opening through which the wiring harness extends.

2. The power supply device according to claim 1, wherein the slider has two opposing curved surfaces for passing the guide rail therebetween.

* * * * *